US011964444B2

(12) United States Patent
Schiavon (10) Patent No.: US 11,964,444 B2
(45) Date of Patent: Apr. 23, 2024

(54) METHOD FOR BUILDING TYRES (71) Applicant: PIRELLI TYRE S.P.A., Milan (IT)

(72) Inventor: Emanuele Luca Schiavon, Bollate (IT)

(73) Assignee: PIRELLI TYRE S.P.A., Milan (IT)

( * ) Notice: Subject to any disclaimer, the term of this patent is extended or adjusted under 35 U.S.C. 154(b) by 156 days.

(21) Appl. No.: 17/615,005

(22) PCT Filed: Jun. 18, 2020

(86) PCT No.: PCT/IB2020/055683
§ 371 (c)(1),
(2) Date: Nov. 29, 2021

(87) PCT Pub. No.: WO2020/261054
PCT Pub. Date: Dec. 30, 2020

(65) Prior Publication Data
US 2022/0219417 A1  Jul. 14, 2022

(30) Foreign Application Priority Data

Jun. 26, 2019 (IT) .................. 102019000010077

(51) Int. Cl.
*B29D 30/08* (2006.01)
*B29D 30/00* (2006.01)
(52) U.S. Cl.
CPC ......... *B29D 30/08* (2013.01); *B29D 30/0016* (2013.01); *B29D 2030/0038* (2013.01); *B29D 2030/082* (2013.01)
(58) Field of Classification Search
CPC .............................................. B29D 2030/082
See application file for complete search history.

(56) References Cited

U.S. PATENT DOCUMENTS

| 5,942,059 A * | 8/1999 | Wulker | B29D 30/60 118/712 |
| 2008/0236726 A1 | 10/2008 | D'Oria et al. | |
| 2016/0266569 A1* | 9/2016 | Caretta | G05B 15/02 |

FOREIGN PATENT DOCUMENTS

| JP | 2003513835 A | 4/2003 |
| JP | 2007527327 A | 9/2007 |

(Continued)

OTHER PUBLICATIONS

International Search Report for International PCT Application No. PCT/IB2020/055683 filed on Jun. 18, 2020, on behalf of Pirelli Tyre S.P.A. dated Oct. 8, 2020. 3 Pages.

(Continued)

*Primary Examiner* — Katelyn W Smith
*Assistant Examiner* — Alexander D Booth
(74) *Attorney, Agent, or Firm* — Steinfl + Bruno LLP (57) ABSTRACT

A method for building tyres is described. An elementary semifinished product is deposited on a building drum rotated by an output end effector of a robotized arm in form of coils forming a component of a tyre. A processor determines a target rotation speed of the building drum and a target value for a speed parameter associated with the rotation. If the target value is not an integer number, the processor: i) determines a drive interval shorter than the effector settling time; ii) calculates first and second values corresponding to integer numbers immediately preceding and immediately following the target value; iii) calculates a speed parameter PWM profile with minimum and maximum values corresponding to the first and second values; and iv) controls the effector according to the PWM profile.

13 Claims, 5 Drawing Sheets

(56) References Cited

FOREIGN PATENT DOCUMENTS

| | | |
|---|---|---|
| JP | 2008500915 A | 1/2008 |
| JP | 4580105 B2 | 11/2010 |
| JP | 2014133418 A | 7/2014 |
| WO | 00/35666 A1 | 6/2000 |
| WO | 01/36185 A1 | 5/2001 |
| WO | 2005/065923 A1 | 7/2005 |
| WO | 2006/000843 A1 | 1/2006 |
| WO | 2008/018098 A1 | 2/2008 |
| WO | 2009/130727 A1 | 10/2009 |
| WO | 2011/148283 A1 | 12/2011 |
| WO | 2015/150970 A1 | 10/2015 |

OTHER PUBLICATIONS

Written Opinion for International PCT Application No. PCT/IB2020/055683 filed on Jun. 18, 2020, on behalf of Pirelli Tyre S.P.A. dated Oct. 8, 2020. 6 Pages.

Office Action for JP Application No. 2021-567930 filed on Jun. 18, 2020 on behalf of Pirelli Tyre Societa Per Azioni. dated Sep. 13, 2023. 4 pages.

* cited by examiner

METHOD FOR BUILDING TYRES

CROSS REFERENCE TO RELATED APPLICATIONS

The present application is the U.S. National Stage of International Patent Application No. PCT/IB2020/055683 filed on Jun. 18, 2020 which, in turn, claims priority to Italian Application No. 1 0201 900001 0077 filed on Jun. 26, 2019.

The present invention relates to a method for building tyres.

The present invention also relates to a working station for deposition of elementary semifinished products for building tyres, which operates in accordance with said method.

A tyre for vehicle wheels generally comprises a carcass structure including at least one carcass ply having respectively opposite end flaps in engagement with respective annular anchoring structures, generally referred to as "bead cores", integrated into the regions usually identified as "beads", the inside diameter of which substantially matches a so-called "fitting diameter" of the tyre for fitting it onto a respective mounting rim. The tyre also comprises a crown structure including at least one belt band located in a radially external position relative to the carcass ply, and a tread band which is radially external to the belt band. Between the tread band and the belt band(s) a so-called "underlayer" of elastomeric material may be interposed, the properties of which are suitable for providing a stable union between the belt band(s) and the tread band. In addition, respective sidewalls of elastomeric material are applied to the side surfaces of the carcass structure, each extending from one of the side edges of the tread band up to the respective annular bead anchoring structure. In tyres of the "tubeless" type, the carcass ply is internally coated with a layer of elastomeric material, preferably a butyl-based one, commonly referred to as "liner", which has optimal air tightness properties and extends from one bead to the other.

The term "elastomeric material" refers to a compound comprising at least one elastomeric polymer and at least one reinforcing charge. Preferably, said compound also comprises additives such as, for example, a reticulating agent and/or a plasticizer. Thanks to the presence of the reticulating agent, said material can be reticulated by heating to form the final product.

The term "elementary semifinished product" refers to a continuous elongated element made of elastomeric material. Preferably, said continuous elongated element comprises one or more reinforcing cords, preferably textile or metallic ones, disposed parallel to each other in the longitudinal direction of the elongated element itself. More preferably, said continuous elongated element is cut to size.

A "component" or "structural component" of a tyre is meant to be any portion of the latter which can perform a specific function, or a part thereof. Tyre components include, for example: liner, underliner, sidewall inserts, bead cores, filler inserts, anti-abrasive layer, sidewalls, carcass ply(ies), belt layer(s), tread band, tread band underlayer, underbelt inserts, etc., or a part thereof.

In a process for depositing an elementary semifinished product by coiling it on a forming drum in order to form a component of a tyre being processed, the term "side-by-side coils" refers to at least two coils arranged axially side by side relative to said forming drum, with or without contact and/or at least partially overlapped radially.

The "settling time Ta" of a system formed by one or more components refers to the time after which a configuration of said system, subjected to a step input, reaches 95% of a final output configuration, i.e. the steady state configuration produced by said step input. Preferably, said final output configuration comprises a final output value of at least one quantity, e.g. a position, a speed, an acceleration, etc.

The "drive interval" of a system refers to a time period shorter than the settling time Ta, preferably shorter than Ta/10, more preferably shorter than Ta/30.

A "pulse-width modulation profile", hereafter referred to as "PWM profile", of a given quantity is a time-related function of said given quantity defined over a given time interval, in which the quantity takes a finite number of values that are not-strictly comprised between a maximum value and a minimum value. More preferably, the values taken by the given quantity in the given time interval are integer values. Even more preferably, the values taken by the given quantity in the given time interval are only said maximum value and said minimum value.

A "decimal number" is a number formed by an integer part and a decimal part; for a decimal number a decimal addend is defined, such that the decimal number is equal to the sum of the integer part and the decimal addend.

Document WO 00/35666 by the present Applicant describes a method and an apparatus for forming a tyre by manufacturing the tyre components directly on a rigid toroidal support, the shape of which matches that of the tyre to be obtained. Some components of the tyre are obtained through delivery from an extruder of an elementary semifinished product to be suitably distributed on the toroidal support while said support is rotated around its own axis. Simultaneously, the toroidal support, suspended from a robotized arm, is moved in front of the extruder so as to determine the transverse distribution of the elementary semifinished product and then form a plurality of circumferential coils therewith, which are disposed in axial side-by-side relationship and/or radially superposed to define the structural component of the tyre.

Document WO 01/36185 by the present Applicant describes a method for manufacturing elastomeric material components of vehicular tyres. A robotized arm having seven axes of actuation imparts to a toroidal support a circumferential distribution motion about its own geometric axis simultaneously with controlled transverse distribution displacements in front of a dispensing organ dispensing a strip of elastomeric material. The strip thus forms a plurality of turns; the orientation and mutual superposition of the turns are controlled in such a way as to control the thickness variations to be conferred on the component to be manufactured, based on a predetermined laying scheme pre-set on an electronic computer. The rotation of the toroidal support is controlled in such a way as to obtain a peripheral speed of application exceeding the theoretical feeding rate of the strip, which can be increased or decreased as needed to form turns with a reduced or, respectively, enlarged cross-section.

Document WO 2009/130727 by the present Applicant describes a process and an apparatus for building tyres. A continuous elongated element of elastomeric material is produced through an extruder at a linear delivery speed and directly fed onto a moving surface of a conveyor without interposition of other devices. The continuous elongated element is advanced on the moving surface along a predetermined direction and at a linear advancing speed different from the linear delivery speed, up to a proximal end of the conveyor. Subsequently, the continuous elongated element is applied onto a forming support, which rotates relative to the proximal end of the conveyor at a peripheral speed different from the linear delivery speed, so as to deform the continuous elongated element and apply it in the form of coils onto said forming support, in order to form a component of elastomeric material of a tyre.

The Applicant observes that, when methods and apparatuses like those described in WO 00/35666 and WO 01/36185 are employed, wherein elementary semifinished products—also called strips or continuous elongated elements—are used in order to form tyre components by deposition on a forming drum (substantially cylindrical or toroidal in shape), precision and accuracy are required in setting the revolution speed of the building drum, because such speed must maintain a precise relationship with the dispensing speed of the feeding member (e.g. extruder, drawplate).

The Applicant has verified, in fact, that if the drum revolution speed is either slower or faster than required, the elementary semifinished product will undergo either less or more traction than expected. This results in an increased/decreased area of the cross-section of the elementary semifinished product, and consequently in an uneven, or anyway different than designed, conformation of the tyre being built.

The Applicant also observes that, when the above-mentioned methods and apparatuses are employed, it is important to control the building drum revolution speed variations with transitions that are smooth and are not abrupt (so called "step-like" transitions). For example, when the diameter of the item loaded on the building drum increases, the revolution speed must change accordingly to keep the tangential speed constant.

The Applicant has verified that, if speed variations are not adequately controlled, discontinuities/unevenness will occur in the structure of the tyre being built, with adverse effects on the performance of the finished tyre.

The Applicant observes that the anthropomorphic robotized arm employed for supporting and rotatably moving the building drum is controlled, for the purpose of defining the revolution speed of its output end effector, by imposing a so-called "override", hereafter referred to as "OVR", expressed as a percentage of the maximum revolution speed of the output end effector itself.

More in detail, in order to control the rotation of the building drum, the initial speed is the feeding speed of the feeding member, e.g. the extruder, and based on such speed the tangential speed of the drum is then determined. Knowing the instantaneous radius of rotation of the tyre being processed on the building drum, one can calculate the angular revolution speed of the building drum and hence of the output end effector. By dividing the angular revolution speed thus calculated by the nominal maximum speed of the output end effector, the theoretical OVR to be imposed is obtained.

The Applicant also observes that, in the anthropomorphic robotized arms currently available, the OVR can only be set as an integer number. If the calculations give a non-integer theoretical OVR, a rounding to the nearest integer is made.

The Applicant has verified that this limitation may cause the above-described problems: since only an integer OVR can be used, it may happen that one cannot impose on the building drum a revolution speed that is correct for the extruder feeding speed, and that speed variations cannot be controlled in a gradual manner. In both cases, as aforesaid, adverse effects may result as far as the quality of the final product is concerned.

The Applicant observes that document WO 2009/130727 does not describe any technique suitable for solving the above-described problems.

In fact, WO 2009/130727 proposes to introduce a conveyor, provided with a mobile surface, between the extruder and the forming support; in this way, the deformation of the continuous elongated element is distributed over two distinct phases, so that the desired cross-section is obtained when deposition occurs on the forming support.

The Applicant believes that such a solution does not improve the precision with which the forming support (i.e. the building drum) is rotated and, as a consequence, does not overcome the above-mentioned drawbacks.

In this context, the Applicant has observed that the mechanics of the anthropomorphic robotized arm, and in particular of the output end effector supporting and rotatably moving the building drum, has response times that are significantly slower than those which can be obtained from the electronic control part of the anthropomorphic robotized arm itself.

The Applicant has perceived that this difference can be used to advantage for controlling the output end effector in a manner such that it will not reach the target speed theoretically imposed through the OVR, but will remain in a continuous transient condition.

As perceived by the Applicant, this operating mode of the output end effector should be employed to obtain actual speeds corresponding also to non-integer theoretical OVR's, thus achieving the necessary accuracy as regards the revolution speed of the building drum.

More specifically, the Applicant has perceived that, by setting a PWM profile for controlling the revolution speed of the output end effector of the anthropomorphic robotized arm over a time interval that is short enough to prevent the response of the mechanical part of said output end effector from being complete, it is possible to rotate the building drum at speeds more closely corresponding to the desired ones.

Finally, the Applicant has found that a speed corresponding to a non-integer OVR can be reached by defining a drive interval for the output end effector and by defining, in said drive interval, a PWM profile for the OVR to be applied to the output end effector.

In accordance with a first aspect, the invention relates to a method for building tyres.

Preferably, it is envisaged to provide an anthropomorphic robotized arm for rotatably moving an output end effector thereof.

Preferably, it is envisaged to associate a building drum with said output end effector.

Preferably, said output end effector rotatably moves said building drum about a geometric axis of said building drum.

Preferably, it is envisaged to feed an elementary semifinished product, at a given linear speed, from a feeding apparatus.

Preferably, it is envisaged to deposit, on said building drum, said elementary semifinished product in the form of side-by-side coils.

Preferably, it is envisaged, when depositing said elementary semifinished product on said building drum in the form of side-by-side coils, to form at least one component of a tyre being processed.

Preferably, it is envisaged to activate a processor in order to determine a target speed for the rotation of said building drum.

Preferably, said target speed is determined as a function of said given linear speed.

Preferably, it is envisaged to activate a processor in order to determine a target value for a speed parameter associated with the rotation of said building drum.

Preferably, said target value for said speed parameter is determined as a function of said target speed.

Preferably, if said target value is not an integer number, it is envisaged to activate a processor for determining a drive interval shorter than a settling time of an anthropomorphic robotized arm-building drum system for said output end effector.

Preferably, if said target value is not an integer number, it is envisaged to activate a processor for calculating a first value, equal to the integer number immediately preceding said target value.

Preferably, if said target value is not an integer number, it is envisaged to activate a processor for calculating a second value, equal to the integer number immediately following said target value.

Preferably, if said target value is not an integer value, it is envisaged to activate a processor for calculating, in said drive interval, a PWM profile for said speed parameter.

Preferably, said PWM profile has a minimum value equal to said first value.

Preferably, said PWM profile has a maximum value equal to said second value.

Preferably, if said target value is not an integer value, it is envisaged to activate a processor for controlling said output end effector as a function of said PWM profile.

The Applicant believes that the revolution speed of the building drum can thus be imposed in a precise and accurate manner, so as to comply with the design specifications and obtain a final product having the expected characteristics.

According to another aspect, the invention relates to a working station for deposition of elementary semifinished products for building tyres.

Preferably, an anthropomorphic robotized arm is employed.

Preferably, said anthropomorphic robotized arm is arranged for rotatably moving an output end effector thereof.

Preferably, it is envisaged to employ a building drum associated with said output end effector.

Preferably, it is envisaged that said output end effector rotatably moves said building drum about a geometric axis of said building drum.

Preferably, a feeding apparatus is employed.

Preferably, said feeding apparatus is configured for feeding an elementary semifinished product at a given linear speed.

Preferably, said elementary semifinished product is deposited on said building drum in the form of side-by-side coils.

Preferably, said elementary semifinished product forms at least one component of a tyre being processed.

Preferably, a control apparatus is employed.

Preferably, said control apparatus is configured for determining a target speed for the rotation of said building drum.

Preferably, said target speed is determined as a function of said given linear speed.

Preferably, said control apparatus is configured for determining a target value for a speed parameter associated with the rotation of said building drum.

Preferably, said target value for said speed parameter is determined as a function of said target speed.

Preferably, if said target value is not an integer number, said control apparatus is configured for determining a drive interval for said output end effector.

Preferably, if said target value is not an integer number, said control apparatus is configured for calculating a first value, equal to the integer number immediately preceding said target value.

Preferably, if said target value is not an integer number, said control apparatus is configured for calculating a second value, equal to the integer number immediately following said target value.

Preferably, if said target value is not an integer value, said control apparatus is configured for calculating, in said drive interval, a PWM profile for said speed parameter.

Preferably, said PWM profile has a minimum value equal to said first value.

Preferably, said PWM profile has a maximum value equal to said second value.

Preferably, if said target value is not an integer number, said control apparatus is configured for controlling said output end effector as a function of said PWM profile.

Under at least one of the above aspects, the present invention may have at least one of the following preferable features.

Preferably, said speed parameter is indicative of a ratio between a generic revolution speed of said output end effector and a maximum revolution speed of said output end effector.

Preferably, said target value for said speed parameter is indicative of a ratio between said target speed and a maximum revolution speed of said output end effector.

Preferably, said drive interval is formed by a first part and a second part.

Preferably, in the first part the speed parameter is equal to said maximum value.

Preferably, in the second part the speed parameter is equal to said minimum value.

Preferably, the first part is defined by a single continuous time interval.

Preferably, the second part is defined by a single continuous time interval.

Preferably, said first part is formed by a plurality of first portions.

Preferably, said second part is formed by a plurality of second portions.

Preferably, the first portions alternate with the second portions.

Preferably, the duration of the first part is equal to the product of the duration of the drive interval by the decimal addend of the target value.

Preferably, the duration of the second part is equal to the product of the duration of the drive interval by the complement with respect to 1 of said decimal addend.

Preferably, in order to control said output end effector as a function of said PWM profile, it is envisaged to impose said PWM profile on said speed parameter.

Preferably, it is envisaged to impose said PWM profile on said speed parameter continuously and repeatedly.

Preferably, in order to determine said target speed, it is envisaged to determine an intermediate linear speed, which is substantially proportional to said given linear speed.

Preferably, in order to determine said target speed, it is envisaged to divide said intermediate linear speed by a radial value associated with the radius of said building drum.

Preferably, said radial value depends on an instantaneous revolution radius of said tyre being processed, carried by said building drum, at a current deposition point.

Preferably, said anthropomorphic robotized arm has at least six degrees of freedom.

Preferably, in order to control said output end effector as a function of said PWM profile, said control apparatus is configured for imposing said PWM profile on said speed parameter.

Preferably, said control apparatus is configured for imposing said PWM profile on said speed parameter continuously and repeatedly.

Preferably, in order to determine said target speed, said control apparatus is configured for determining an intermediate linear speed, which is substantially proportional to said given linear speed.

Preferably, in order to determine said target speed, said control apparatus is configured for dividing said intermediate linear speed by a radial value associated with an instantaneous revolution radius of said tyre being processed, carried by said building drum, at a current deposition point.

Preferably, an integral of said PWM profile on said drive interval is substantially equal to the product of said target value by the duration of said drive interval.

Further features and advantages will become more apparent in the light of the following detailed description of a preferred, but non-limiting, embodiment of the invention. Such description is provided herein with reference to the annexed drawings, also supplied by way of non-limiting example, wherein.

With reference to the annexed drawings, 1 designates as a whole a working station for deposition of elementary semifinished products for building tyres, in which the present invention can be implemented.

Figure 2:
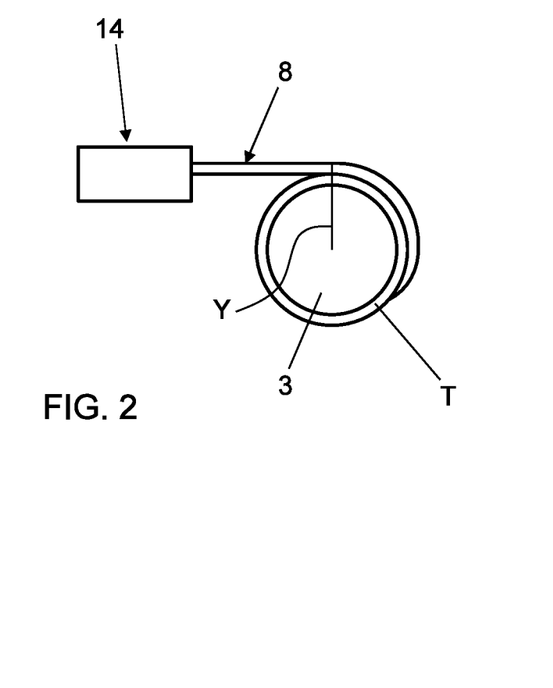
FIGS. 2 and 3 schematically show some parts of the working station of FIG. 1.
Figure 3:
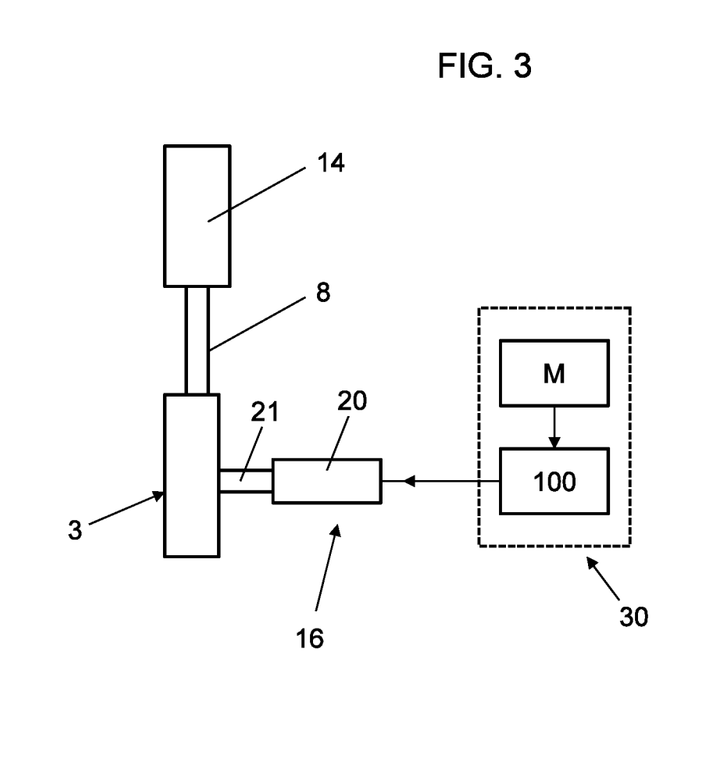

Preferably, the working station 1 comprises at least one feeding apparatus 14 for feeding an elementary semifinished product 8 (FIGS. 2, 3).

More in particular, the feeding apparatus 14 is arranged to supply, through a respective feeding member 14a, the elementary semifinished product 8.

The elementary semifinished product 8 is fed at a given linear speed LS.

Preferably, the working station 1 comprises also a building drum 3. Preferably, the building drum 3 has a substantially cylindrical or toroidal shape.

The building drum 3 has a radially external surface 3a whereon the elementary semifinished product 8 is deposited for making one or more components of a tyre.

Preferably, the working station 1 comprises an anthropomorphic robotized arm 16 associated with the building drum 3. Preferably, the anthropomorphic robotized arm 16 has at least six axes of rotation.

Figure 1:
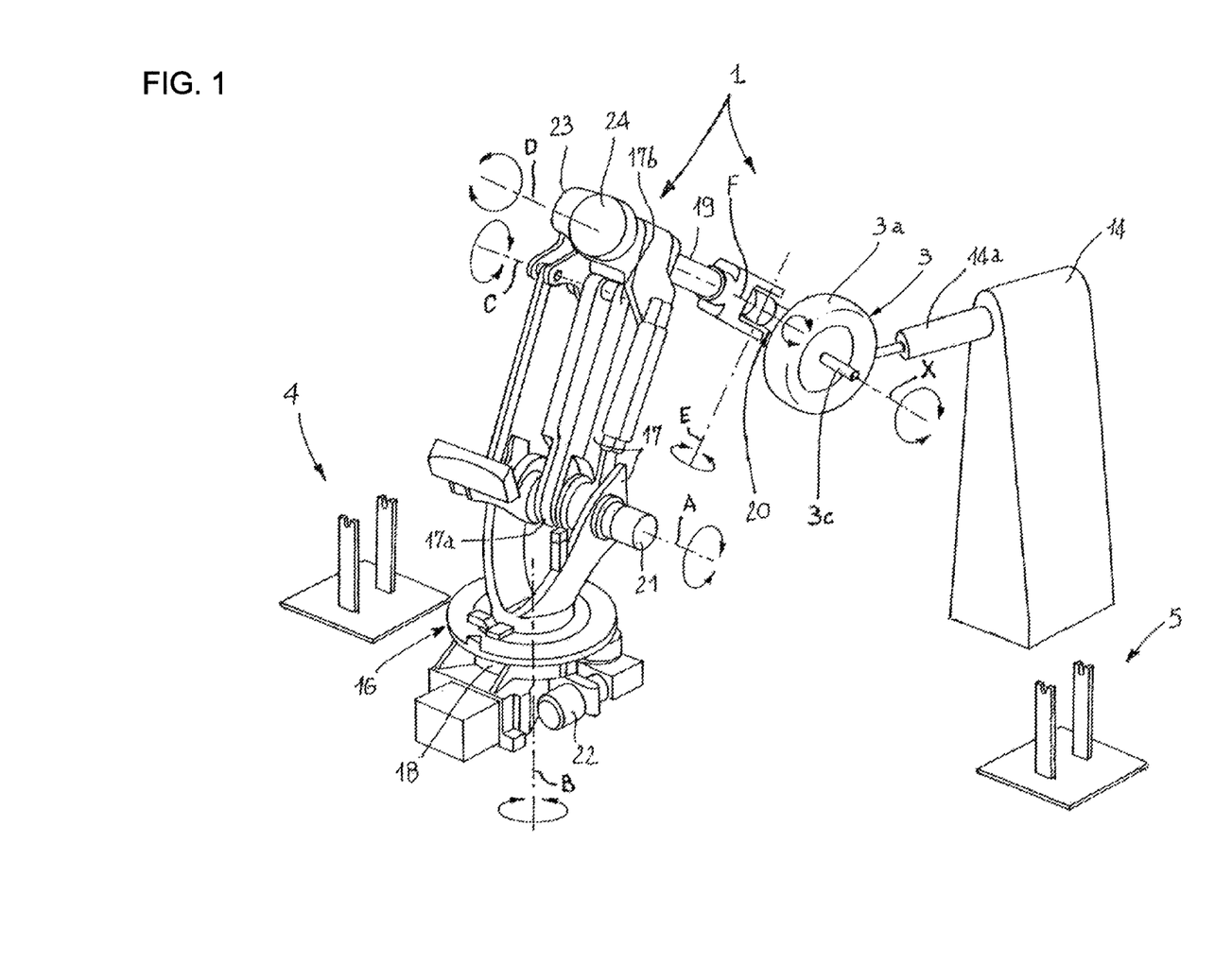
FIG. 1 schematically shows a working station comprising an anthropomorphic robotized arm, where the invention can be implemented.

By way of example, the anthropomorphic robotized arm 16 shown in FIG. 1 has seven axes of rotation: "A", "B", "C", "D", "E", "F", "X".

In particular, the anthropomorphic robotized arm 16 comprises a first section 17 having a first end 17a rotatably connected to a supporting platform 18 through a first axis of oscillation "A" arranged horizontally, and a second axis "B" arranged vertically or anyway perpendicular to the first axis of oscillation "A".

The anthropomorphic robotized arm 16 further comprises a second section 19 constrained to a second end 17b of the first section 17, with the possibility of oscillating about a third axis "C", preferably parallel to the first axis "A", and also about a fourth axis of oscillation "D", perpendicular to the third axis "C" and preferably arranged longitudinally relative to the second section 19 itself.

A terminal head 20 adapted to removably engage with the building drum 3 is operationally associated with one end of the second section 19. The terminal head 20 comprises an output end effector 21 (FIG. 3), which rotatably moves the building drum 3 about a geometric axis X of the building drum 3 itself.

For example, the output end effector 21 may be coupled to a mounting spigot 3c protruding coaxially from opposite sides of the building drum 3.

It should be noted that in FIG. 3 the anthropomorphic robotized arm 16 is not entirely shown; in fact, for the sake of simplicity only the terminal head 20 and the output end effector 21 are schematically illustrated.

The terminal head 20 can also oscillate about a fifth axis "E", perpendicular to the fourth axis of oscillation "D".

In a preferred implementation solution, the fifth axis "E" is coplanar to the fourth axis "D", and the terminal head 20 can also oscillate, driven by a respective motor (not shown), about a sixth axis "F" oriented perpendicularly to the building drum 3 and also relative to the fifth axis of oscillation "E".

The movements of the first section 17, of the second section 19 and of the terminal head 20 about the respective axes of oscillation "A", "B", "C", "D" "E", "F" are handled by respective motors, of which only those are visible in FIG. 1, designated by numerals 21, 22, 23, 24, which provide the movements about the first axis "A", the second axis "B", the third axis "C" and the fourth axis "D", respectively.

The motor for the movements about the fifth axis "E", not shown in the drawings, may be implemented, just like the other motors, in any advantageous manner known to a person skilled in the art.

Advantageously, the building drum 3 is picked up by the anthropomorphic robotized arm 16 from a pick-up position 4. The anthropomorphic robotized arm 16 then carries the building drum 3 near the feeding apparatus 14 for the deposition of the elementary semifinished product 8. The building drum 3 is finally laid into a deposition position 5.

In particular, the anthropomorphic robotized arm 16 is configured for moving the building drum 3 while the feeding apparatus 14 is feeding the elementary semifinished product 8. In this way, the elementary semifinished product 8 is laid onto the radially external surface 3a of the building drum 3 in coils arranged side by side, for making at least one component of a tyre T being processed.

More in detail, during the forming of the at least one component of the tyre T being processed, the building drum 3 remains engaged with the anthropomorphic robotized arm 16, which provides for orienting it appropriately with respect to the feeding apparatus 14 and for rotating it about the geometric axis "X" synchronously with the feeding apparatus 14, so as to accomplish the deposition of the elementary semifinished product 8.

The mobility of the building drum 3 about the six axes of oscillation "A", "B", "C", "D", "E", "F" and the rotation of the same about the geometric axis "X" ensure the correct deposition of the elementary semifinished product 8 coming from the feeding apparatus 14.

Figure 4:
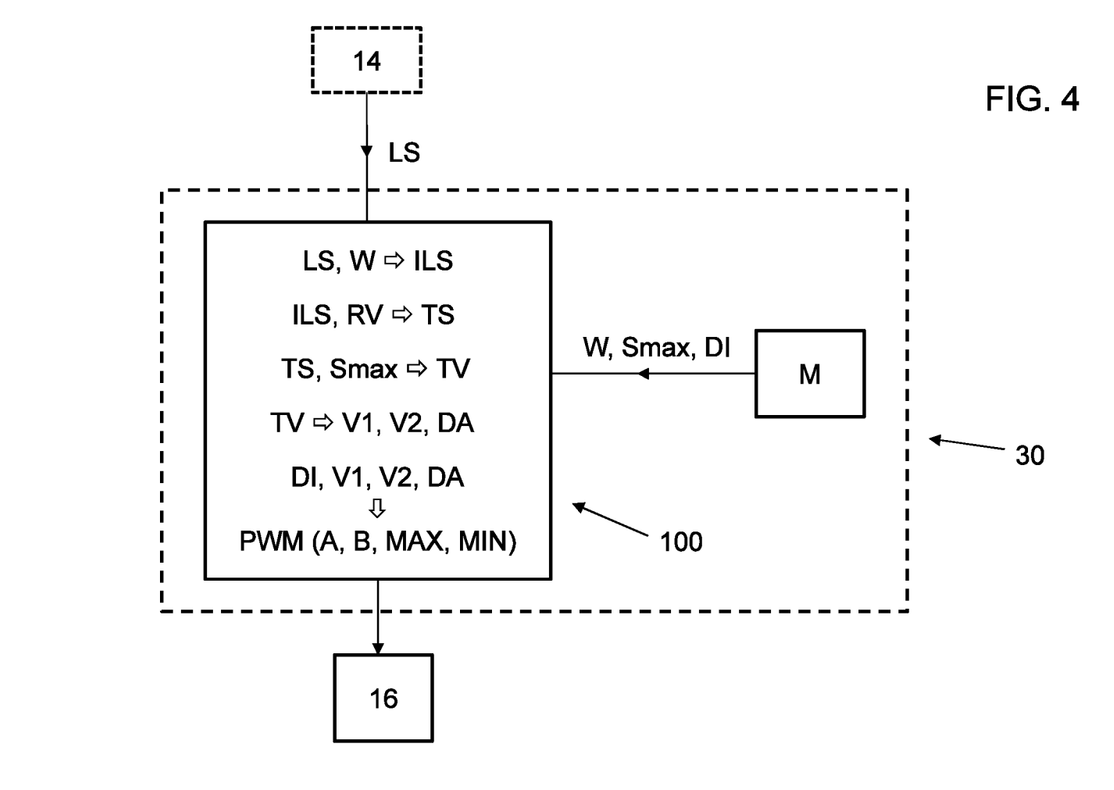
FIG. 4 shows a block diagram of a control apparatus included in the working station of FIG. 1.

Preferably, the working station 1 comprises a control apparatus 30 (FIGS. 3, 4).

The control apparatus 30 is configured for controlling at least the movements of the anthropomorphic robotized arm 16.

From a practical viewpoint, the control apparatus 30 can be implemented as a personal computer, a PLC or any other electronic apparatus capable of performing the operations described below.

Advantageously, the control apparatus 30 is equipped with at least one processor 100 and a memory M associated therewith. The control apparatus 30 is also equipped with the input/output connections necessary to allow communicating with other electronic devices that may be included in the working station 1 and/or in the plant that comprises the working station 1.

The control apparatus 30, in particular the processor 100, is activated for determining, as a function of the linear speed LS, a target speed TS for the rotation of the building drum 3.

The linear speed LS may be acquired, for example, by communicating with the feeding apparatus 14.

Preferably, in order to determine the target speed TS, an intermediate linear speed ILS is first determined, which is substantially proportional to the linear speed LS. The coefficient of proportionality W between the given linear speed LS and the intermediate linear speed ILS may, for example, be defined a priori and stored into said memory M.

The ratio between the given linear speed LS and the intermediate linear speed ILS is a function of the traction to which the elementary semifinished product 8 is to be subjected as it is deposited on the building drum 3.

The intermediate linear speed ILS is then divided by a radial value RV, associated with the radius of the building drum 3. In particular, such radial value RV depends on an instantaneous radius of rotation Y of the tyre T being processed, carried by the building drum 3, at a current deposition point.

In practical terms, the radial value RV represents the radius of the cylinder formed by the assembly consisting of the building drum 3 and the tyre T being processed.

In one embodiment, the intermediate linear speed ILS is not calculated, and the target speed TS is determined by directly dividing the linear speed LS by the radial value VR.

The target speed TS represents the angular speed at which the building drum 3 must be rotated for the elementary semifinished product 8 to be deposited on the building drum 3 under the traction required to comply with the design data.

Since the building drum 3 is mounted integrally with the output end effector 21 of the anthropomorphic robotized arm 16, the target speed TS also represents the angular speed at which the output end effector 21 must be rotated.

Once the target speed TS has been determined, the control apparatus 30 (in particular, the processor 100) determines, as a function of the target speed TS, a target value TV for a speed parameter SP associated with the rotation of the building drum 3.

Preferably, the speed parameter SP is the so-called "override", i.e. a ratio between the speed at which the output end effector 21 of the anthropomorphic robotized arm 16 must be rotated (which speed is represented by the target speed TS) and a maximum revolution speed Smax of the same output end effector 21, wherein said ratio is multiplied by 100.

In general, the speed parameter SP can be expressed as $$SP = \frac{S^*}{S\max} \cdot 100$$

where S* is the generic revolution speed of the end effector 21.

The maximum revolution speed Smax is a datum set a priori, e.g. stored in the memory M associated with the processor 100.

The target value TV for the speed parameter SP is calculated by imposing that S* is equal to the target speed TS, i.e.:

$$TV = \frac{TS}{S\max} \cdot 100$$

At this point, two cases will substantially occur: the target value TV is an integer number or is not an integer number.

In this respect, the Applicant observes that the expression "integer number" should be understood on the basis of predetermined approximations/roundings, e.g. as a function of the desired level of precision. By way of example, when a precision of two decimal places is needed, the decimal number 72.999 can be approximated to 73, and will thus be considered as an integer number (likewise, 72.003 can be approximated to 72, and will thus be considered as an integer number), whereas the number 72.992 can be approximated to 72.99, i.e. a decimal number with two decimal digits.

In the case wherein the target value TV is an integer number, it will be possible to directly impart to the anthropomorphic robotized arm 16 a command for the rotation of the output end effector 21 on the basis of such integer number.

Conversely, if the target value TV is not an integer number, it is advantageously envisaged to execute a series of operations in order to bring the operation of the system as close as possible to that which would correspond to such non-integer number.

More in detail, it is possible to determine experimentally a settling time ST of the system consisting of the assembly including the anthropomorphic robotized arm 16 and the building drum 3.

In this regard, the Applicant observes that, by isolating and analyzing the transfer function of said system, having a speed command for the output end effector 21 of the anthropomorphic robotized arm 16 as input and the angular revolution speed of the output end effector 21 (i.e. the angular revolution speed of the building drum 3) as output, it is possible to approximate such function to a first-order system.

A drive interval DI is then determined, which is shorter than said settling time ST. Preferably, the drive interval DI is shorter than $\frac{1}{10}$ of the settling time ST, more preferably shorter than $\frac{1}{30}$ of the settling time ST.

From a practical viewpoint, the selected drive interval DI must be sufficiently short, so that, within said time interval, the output end effector 21 will not be able to reach a speed equal to the value imposed by the control electronics (i.e. by the control apparatus 30/processor 100), but will accelerate/decelerate while following such value.

The Applicant observes that this is made possible by the fact that the substantially mechanical system consisting of the anthropomorphic robotized arm 16 and the building drum 3 has response times that are significantly longer than the times which are typical of the control electronics. This implies that the control apparatus 30 (and in particular the processor 100) can modify the command signal directed to the output end effector 21 in a much shorter time than required by the output end effector 21 in order to fully execute the operation corresponding to said command signal.

As will become apparent below, this aspect can be exploited to have the anthropomorphic robotized arm 16 operate substantially as it would if a non-integer speed parameter SP could be imposed thereon.

Preferably, the drive interval DI may have a duration comprised between 80 ms and 120 ms; for example, the drive interval DI may have a duration of approximately 100 ms.

The control apparatus 30 (in particular, the processor 100) provides for calculating a first value V1, equal to the integer number immediately preceding the target value TV.

For example, if the target value TV for the speed parameter SP is 72.7, the first value V1 will be 72.

The control apparatus 30 (in particular, the processor 100) provides for calculating a second value V2, equal to the integer number immediately following the target value TV.

Still with reference to the above-mentioned example, wherein the target value TV is 72.7, the second value V2 will be 73.

The control apparatus 30 (in particular, the processor 100) provides for calculating, in the drive interval DI, a PWM profile for the speed parameter SP.

The PWM profile has a minimum value MIN equal to the first value V1 and a maximum value MAX equal to the second value V2.

The PWM profile is determined in such a way that an integral of the PWM profile on the drive interval DI is substantially equal to the target value TV multiplied by the duration of the drive interval DI.

In brief, the relation can be represented by the following equation:

$$\int_{t=T1}^{t=T2} PWM(t)dt = TV \cdot (T2 - T1)$$

where T1 and T2 represent, respectively, the initial instant and the final instant of the drive interval DI.

Figure 5:
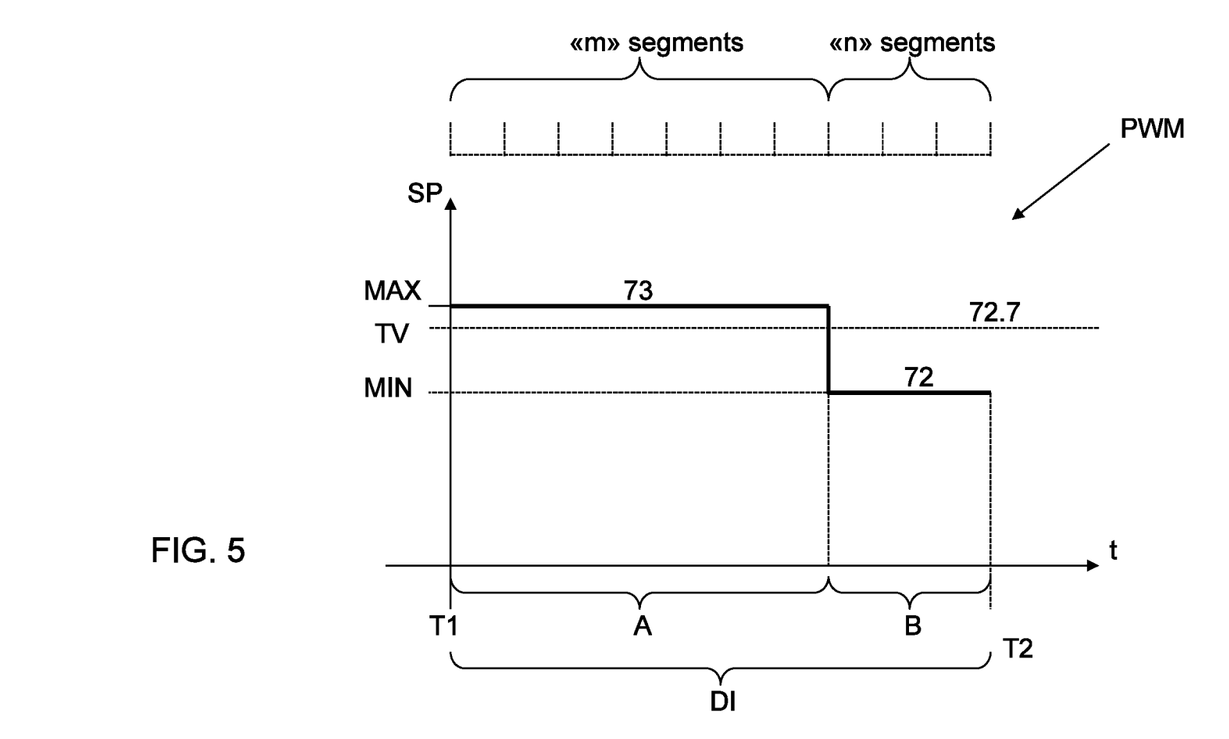
FIGS. 5 and 6 show two embodiments of a function used in the present invention.
Figure 6:
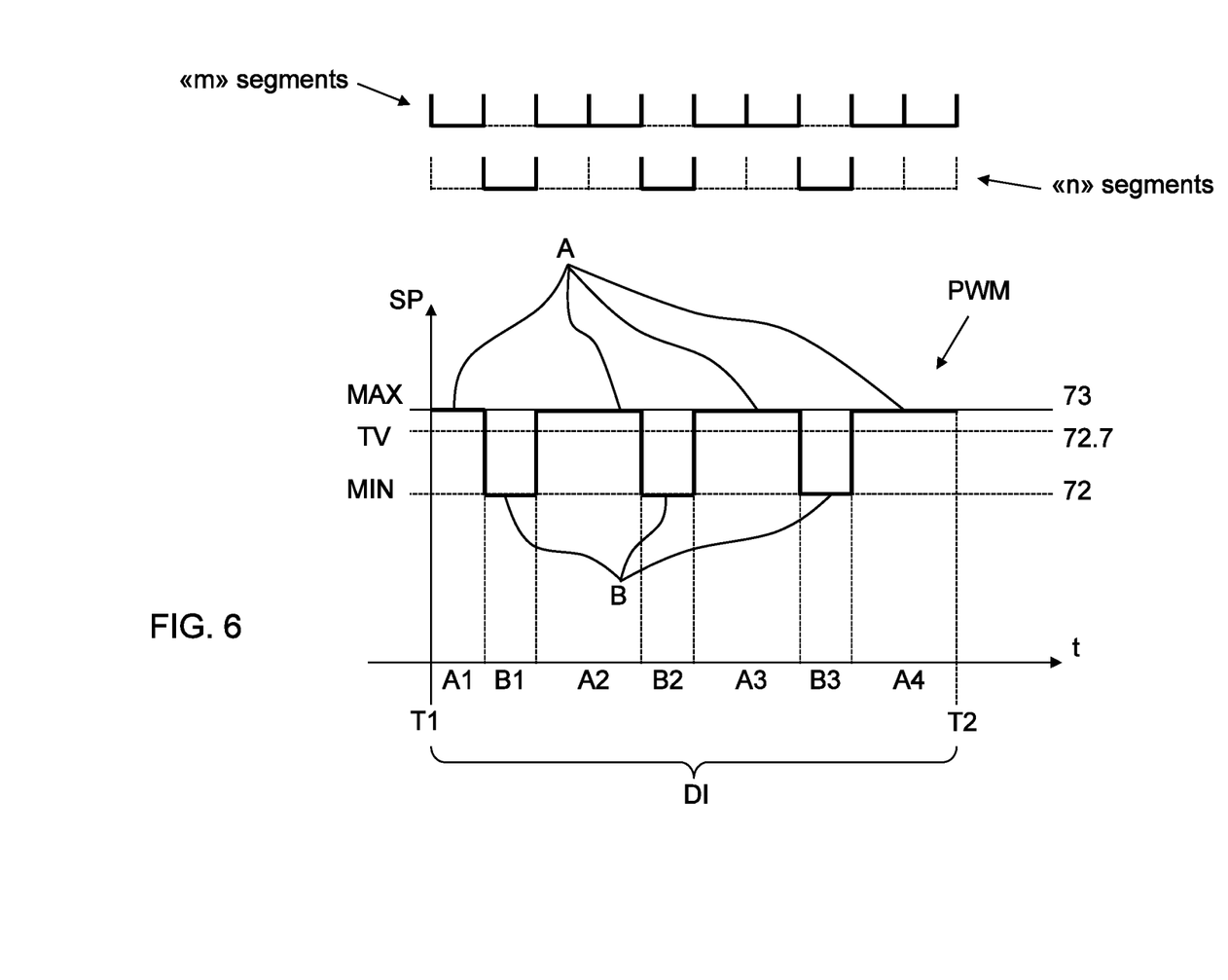

FIGS. 5-6 schematically show a PWM profile created on the basis of a target value of 72.7. As can be seen, the minimum value MIN of the PWM profile is 72 (i.e. equal to said first value V1), and the maximum value MAX of the PWM profile is 73 (i.e. equal to said second value V2).

More in detail, the drive interval DI is formed by a first part A and a second part B. The union of the first part A and the second part B defines the drive interval DI.

In the first part A, the speed parameter SP is equal to the maximum value MAX (73 in the example of FIGS. 5-6).

In the second part B, the speed parameter SP is equal to the minimum value MIN (72 in the example of FIGS. 5-6).

Preferably, the duration of the first part A is equal to the product of the duration of the drive interval DI by the decimal addend DA of the target value TV.

Preferably, the duration of the second part B is equal to the product of the duration of the drive interval DI by the complement with respect to 1 of the decimal addend DA of the target value W.

In the example of FIGS. 5-6, the decimal addend DA of the target value TV is 0.7. Therefore, the duration of the first part A is 0.7×DI, and the duration of the second part B is 0.3×DI.

In one embodiment (FIG. 5), each one of the first part A and the second part B is defined by a single continuous time interval. The Applicant believes that this solution is advantageous from a computational viewpoint.

In one embodiment (FIG. 6), the first part A is formed by a plurality of first portions A1 . . . Ak, and the second part B is formed by a plurality of second portions B1 . . . Bj; the first portions (A1 . . . Ak) alternate with the second portions (B1 . . . Bj). In the example of FIG. 6, k=4 and j=3. Nevertheless, k and j may have the same values, or k may be smaller than j.

It should be noted that FIGS. 5-6 are schematic representations of the above-described PWM profiles, and do not analytically reflect the values mentioned herein by way of example.

From a computational viewpoint, once the target value TV and the drive interval DI have been defined, the latter is subdivided into N segments, preferably all having the same duration. The maximum value MAX is associated with some of the N segments (e.g., with "m" segments, where m<N). The minimum value MIN is associated with the remaining segments ("n" segments, where n=N-m).

The set of "m" segments with the maximum value MAX forms the first portion A.

The set of "n" segments with the minimum value MIN forms the second portion B.

FIG. 5 shows the embodiment wherein the "m" segments with the maximum value MAX form a single continuous interval, and the "n" segments with the minimum value MIN form a single continuous interval.

FIG. 6 shows, on the other hand, the embodiment wherein the "m" segments with the maximum value MAX form first portions A1 . . . Ak, and the "n" segments with the minimum value MIN form second portions B1 . . . Bj, and the first portions A1 . . . Ak alternate with the second portions B1 . . . Bj.

Each first portion A1 . . . Ak may be formed by one or more of the "m" segments having the maximum value MAX.

Each second portion B1 . . . Bj may be formed by one or more of the "n" segments having the minimum value MIN.

The number N of segments depends on the desired precision.

For example, with N=10 it will be possible to accurately manage a target value TV having only one decimal place, i.e. with a 1-digit decimal addend DA.

By setting N=100, instead, it will be possible to accurately manage a target value TV having two decimal places, i.e. with a 2-digit decimal addend DA.

Once the PWM profile has been determined, the output end effector 21 of the anthropomorphic robotized arm can be controlled according to such PWM profile. In particular, the PWM profile is imposed on the speed parameter SP. From a practical viewpoint, the value MAX and the value MIN are imposed on the speed parameter SP in accordance with the PWM profile. This is preferably done continuously and repeatedly, particularly until the target speed TS of the building drum 3 is changed.

In this way, the output end effector 21 of the anthropomorphic robotized arm 16 is controlled by signals that change faster than the output end effector 21 can change its own revolution speed. This implies that the output end effector 21 will not be able to reach the speed values imposed by the command signals coming from the control apparatus 30, i.e. from the processor 100, and will keep its own revolution speed between the maximum value MAX and the minimum value MIN of the PWM profile. By adequately setting, as illustrated above, the maximum value MAX and the minimum value MIN, as well as the duration of the time interval in which the PWM profile takes such values, it is therefore possible to impose on the output end effector 21 a revolution speed that is different from the system's native ones associated with integer values of the speed parameter SP. In particular, it is possible to impose revolution speeds more accurately corresponding to the target sped TS, so that the elementary semifinished product 8 will be deposited under the expected traction, and the resulting tyre will have the structural characteristics dictated by the design specifications.

The invention claimed is:

1. A method for building tyres, comprising:
providing an anthropomorphic robotized arm for rotatably moving an output end effector thereof;
associating a building drum with the output end effector, wherein the output end effector is configured to rotatably move the building drum about a geometric axis of the building drum;
feeding an elementary semifinished product, at a given linear speed, from a feeding apparatus;
depositing, on the building drum, the elementary semifinished product in form of side-by-side coils, to form at least one component of a tyre being processed;
activating a processor for determining a target speed, as a function of the given linear speed, for rotation of the building drum;
activating the processor for determining a non-integer target value, as a function of the target speed, for a speed parameter associated with the rotation of the building drum;
upon determination of the non-integer target value, activating the processor in order to execute the following operations:
determining a drive interval shorter than a settling time of an anthropomorphic robotized arm-building drum system for the output end effector;
calculating a first value, equal to an integer number immediately preceding the non-integer target value;
calculating a second value, equal to an integer number immediately following the non-integer target value;
calculating, in the drive interval, a pulse width modulation (PWM) profile for the speed parameter, the PWM profile having a minimum value equal to the first value and a maximum value equal to the second value; and
controlling the output end effector as a function of the PWM profile.

2. The method according to claim 1, wherein the speed parameter is indicative of a ratio between a generic revolution speed of the output end effector and a maximum revolution speed of the output end effector.

3. The method according to claim 1, wherein the non-integer target value for the speed parameter is indicative of a ratio between the target speed and a maximum revolution speed of the output end effector.

4. The method according to claim 1, wherein the drive interval is formed by a first part and a second part, wherein:
in the first part, the speed parameter is equal to the maximum value; and
in the second part, the speed parameter is equal to the minimum value.

5. The method according to claim 4, wherein each one of the first part and second part is defined by a single continuous time interval.

6. The method according to claim 4, wherein:
the first part is formed by a plurality of first portions,
the second part is formed by a plurality of second portions, and
the first portions alternate with the second portions.

7. The method according to claim 4, wherein:
a duration of the first part is equal to a product of a duration of the drive interval and a decimal addend of the non-integer target value, and
a duration of the second part is equal to a product of the duration of the drive interval and a complement with respect to 1 of the decimal addend.

8. The method according to claim 1, wherein controlling the output end effector as a function of the PWM profile comprises imposing the PWM profile on the speed parameter.

9. The method according to claim 8, wherein the PWM profile is imposed on the speed parameter continuously and repeatedly.

10. The method according to claim 1, wherein determining the target speed comprises:
determining an intermediate linear speed substantially proportional to the given linear speed; and
dividing the intermediate linear speed by a radial value associated with a radius of the building drum.

11. The method according to claim 10, wherein the radial value depends on an instantaneous revolution radius of the tyre being processed, carried by the building drum, at a given deposition point.

12. The method according to claim 1, wherein the anthropomorphic robotized arm has at least six degrees of freedom.

13. The method according to claim 1, wherein an integral of the PWM profile through the drive interval is substantially equal to a product of the non-integer target value and a duration of the drive interval.

* * * * *